US008793198B1

(12) United States Patent
Thomas

(10) Patent No.: US 8,793,198 B1
(45) Date of Patent: Jul. 29, 2014

(54) AUTONOMOUS SEMANTIC SOFTWARE AGENTS AND DESIGN METHOD THEREFOR, AND ONLINE SIMULATION APPARATUS USING AN INFERENCE ENGINE

(75) Inventor: James Alan Thomas, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 355 days.

(21) Appl. No.: 13/373,746

(22) Filed: Nov. 16, 2011

(51) Int. Cl.
*G06F 15/18* (2006.01)

(52) U.S. Cl.
USPC .......................................................... 706/12

(58) Field of Classification Search
USPC ...................................................... 706/12, 45
See application file for complete search history.

(56) References Cited

U.S. PATENT DOCUMENTS

| 2010/0070448 | A1* | 3/2010 | Omoigui | 706/47 |
| 2011/0047148 | A1* | 2/2011 | Omoigui | 707/723 |
| 2012/0191716 | A1* | 7/2012 | Omoigui | 707/740 |

OTHER PUBLICATIONS

Lee, Ming-Che, Kun Hua Tsai, and Tzone I. Wang. "A practical ontology query expansion algorithm for semantic-aware learning objects retrieval." Computers & Education 50.4 (2008): 1240-1257.*
Warden, Tobias, et al. "Towards ontology-based multiagent simulations: The plasma approach." 24th European conference on modelling and simulation (ECMS 2010). European Council for Modelling and Simulation. 2010.*
Raubal, Martin, and Werner Kuhn. "Ontology-based task simulation." Spatial Cognition and Computation 4.1 (2004): 15-37.*
Guo, Qing-lin, and Ming Zhang. "Semantic information integration and question answering based on pervasive agent ontology." Expert Systems with Applications 36.6 (2009): 10068-10077.*
Gianni, Daniele, Andrea D'Ambrogio, and Giuseppe Iazeolla. "Ontology-based specification of simulation sequences." International Journal of Simulation, Systems and Technologies, special issue on Ontology, Modelling and Simulation (2010): 82-93.*

* cited by examiner

*Primary Examiner* — David Vincent
(74) *Attorney, Agent, or Firm* — Gerhard W. Thielman, Esq.

(57) ABSTRACT

A semantic software agent and methods for designing and implementing the software agent and multi-agent systems, where the semantic software agent includes an interface adapter configured to receive instances of data collected and queries from an external source; a semantic repository configured to receive the instances and queries from the interface adapter; and an inference engine configured to receive the instance data from the semantic repository and to generate semantic inferences on the instances based on an ontology and semantic rules. An online simulation apparatus is also provided to generate actions and events for a simulation environment in real-time.

10 Claims, 13 Drawing Sheets

AUTONOMOUS SEMANTIC SOFTWARE AGENTS AND DESIGN METHOD THEREFOR, AND ONLINE SIMULATION APPARATUS USING AN INFERENCE ENGINE

STATEMENT OF GOVERNMENT INTEREST

The invention described herein was made in the performance of official duties by one or more employees of the Department of the Navy, and the invention herein may be manufactured, practiced, used, and/or licensed by or for the Government of United States of America without the payment of any royalties thereon or therefor.

BACKGROUND

The present invention relates to autonomous semantic software agents (ASSA), and more specifically, to the design, implementation, testing and simulation of autonomous software agents via Semantic Web technologies and standards.

The Semantic Web (e.g., "Web 3.0") is an evolutionary stage of the World Wide Web (i.e., "Web" or "W3") in which automated software can store, exchange and use machine-readable information distributed through the Web and in turn enable users to deal with the information efficiently. Unlike the first generation of the Internet, the World Wide Web Consortium ("W3C") has developed key Semantic Web standards prior to development of related technologies. The development of these standards has led to an increasing use in knowledge management applications unrelated to Semantic Web activity. Semantic metadata are data intended to describe other data by capturing the meaning of the thereof. The metadata are formally structured and specified by description in formal logic so that software agents can automatically understand and process the metadata. Software agents are intelligent software components which typically work autonomously to aid human users in decision making and performing actions in different domains.

It is desirable to have software agents which are based on the Semantic Web technologies and standards, and enable these agents to make use of ontologies and semantic rules to thereby provide more efficient machine reasoning and autonomy.

SUMMARY OF THE INVENTION

According to one embodiment of the present invention, a semantic software agent is provided. The semantic software agent includes an interface adapter configured to receive instances of data collected and queries from an external source; a repository configured to receive the instances and queries from the interface adapter; and an inference engine configured to receive the instance data from the repository and to generate semantic inferences on the instances based on an ontology and semantic rules.

According to another embodiment of the present invention, a multi-agent system is provided. The multi-agent system includes a plurality of semantic software agents. Each software agent includes an interface adapter configured to receive instances of data collected and queries from an external source; a repository configured to receive the instances and queries from the interface adapter; and an inference engine configured to receive the instance data from the repository and to generate semantic inferences on the instances based on an ontology and semantic rules.

According to yet another embodiment of the present invention, a computer-implemented method for designing and implementing a semantic software agent is provided. The method includes defining or selecting an ontology; defining or selecting a plurality of semantic rules; defining at least one software agent; generating the at least one software agent; performing testing or simulations on the at least one software agent generated; and finalizing a design of the at least one software agent generated, based on the testing or simulations performed.

According to yet another embodiment of the present invention, an online simulation apparatus is provided. The online simulation apparatus includes an interface adapter configured to receive simulated data and outcomes from a simulation environment; a repository configured to receive the simulated data in the form of instances and the outcomes from the interface adapter; and an inference engine configured to receive the instances and outcomes from the repository and to generate semantic inferences on the instances based on an ontology and semantic rules and generates actions and events to be input into the simulation environment in real-time.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE FIGURES

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF EXEMPLARY EMBODIMENTS

Figure 1:
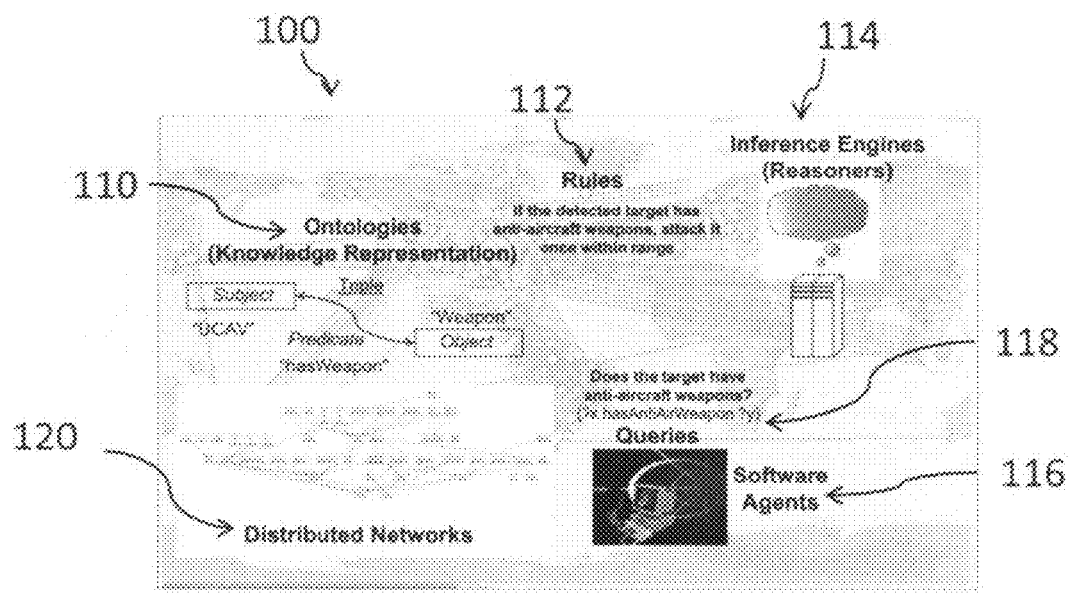
FIG. 1 is a diagram illustrating Semantic Web Technologies to be implemented within embodiments of the present invention.

With reference now to FIG. 1, an example of key Semantic Web Technologies is provided. As shown, the Semantic Web technologies structure 100 include formal ontologies 110 which are formal logic specification of important concepts for a domain application. As shown in FIG. 1, the ontologies 110 include a triple which is an expression that makes a statement in the form of "subject-predicate-object" where the subject denotes a resource and the predicate denotes traits or aspects of the resource and expresses a relationship between the subject and the object. In FIG. 1, the triple indicates that an Unmanned Combat Aerial Vehicle (UCAV) has a weapon, where the UCAV is the subject, the weapon is the object and the predicate is "has". There are also rules 112 which operate on the ontologies 110 and inference engines 114 (i.e., semantic reasoners) which include software that reason (i.e., draw logical inferences) based on knowledge represented in ontology of the domain application. In the example shown in FIG. 1, the rules 112 include that "If the detected target has anti-aircraft weapons, attack it once within range." The Semantic Web technologies 100 further includes software agents 116. These software agents 116 may automate some tasks, or discover, collect, organize and analyze information to support human decision-making in a number of different domains. According to embodiments of the present invention, the software agents 116 are autonomous semantic software agents (ASSA) that are based on the Semantic Web Technologies and standards. These software agents 116 receive and respond to queries 118 and make use of ontologies 110 and semantic rules 112. These technologies 100 are built upon distributed networks 120 that form the Internet/World Wide Web and a foundation of new and existing W3C standards. Embodiments of the present invention may be applied to various applications, e.g., system interoperability and decision-making.

Additional details regarding the ASSAs will be discussed below with reference to FIGS. 2 and 3.

Figure 2:
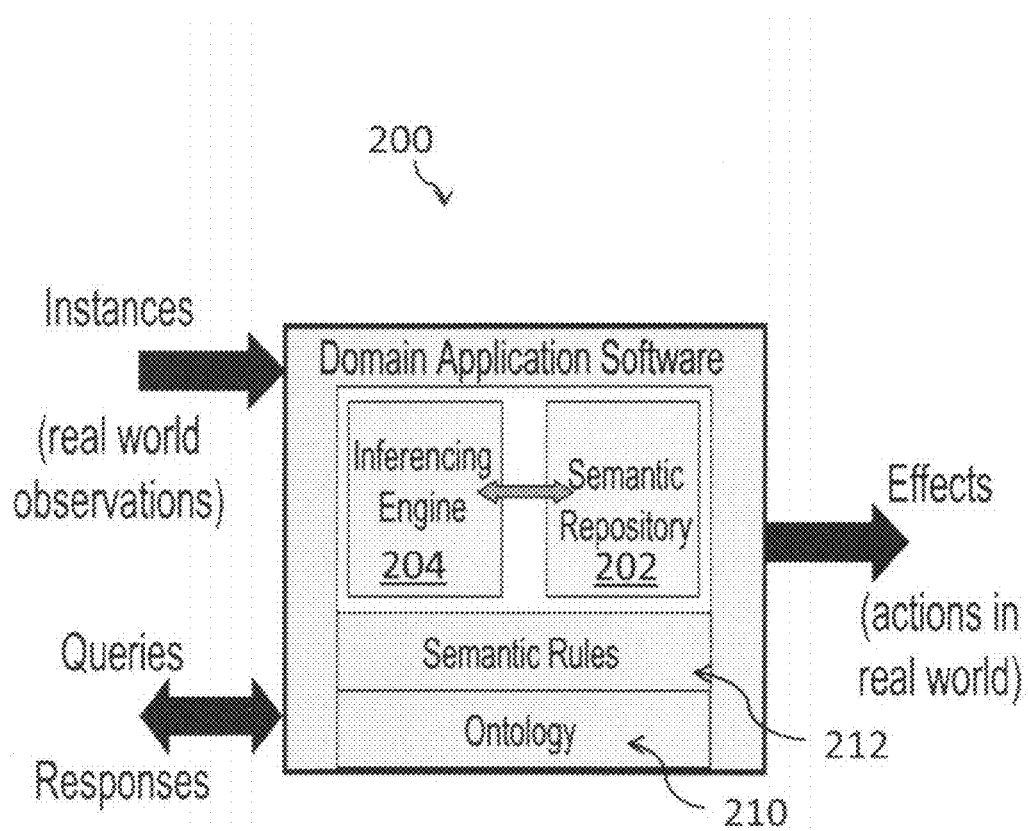
FIG. 2 is a diagram illustrating an interaction between an autonomous semantic software agent (ASSA) and the outside (i.e., real) world that can be implemented within embodiments of the present invention.
Figure 3:
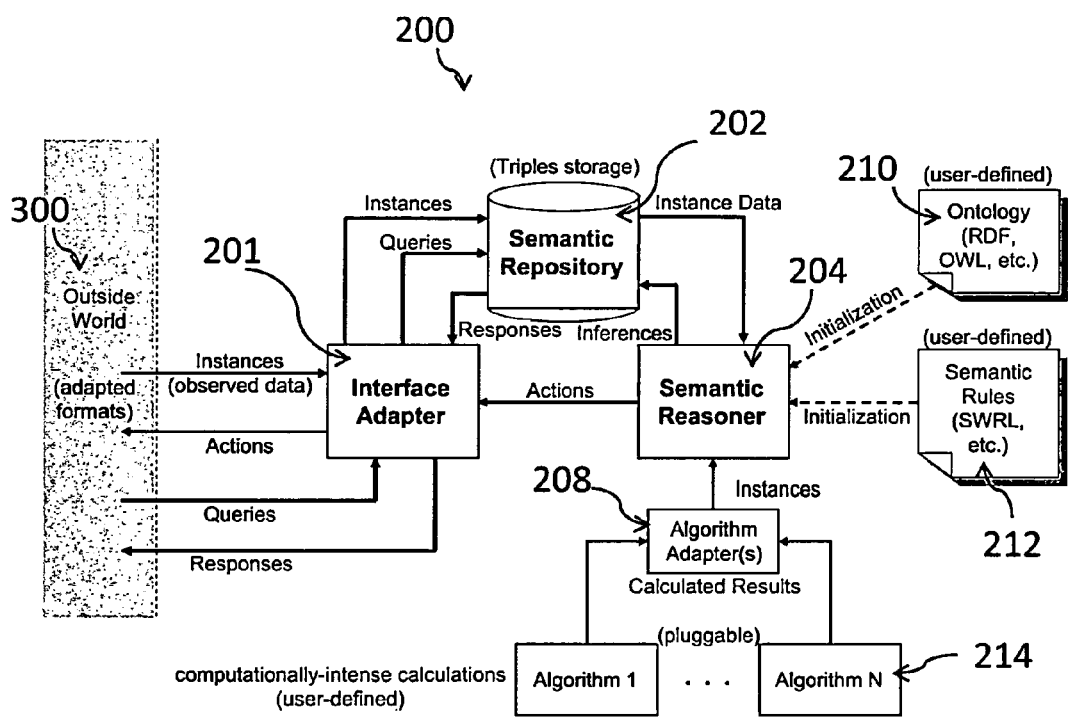
FIG. 3 is a detailed diagram illustrating components of the ASSA shown in FIG. 2 that can be implemented within embodiments of the present invention.

FIG. 2 is a diagram illustrating an interaction between a semantic software agent (ASSA) and the outside (i.e., real) world that can be implemented within embodiments of the present invention; and FIG. 3 is a detailed diagram illustrating components of the ASSA that can be implemented within embodiments of the present invention.

As shown in FIG. 2, an ASSA 200 according to an embodiment of the present invention is provided. The ASSA 200 is a generic programmable software-based system that enables high levels of computer-based automation. The ASSA architecture supports many different applications in many different domains. The ASSA 200 can be programmed for different applications and domains via an ontology 210 and a set of semantic rules 212. As further shown in FIG. 2, the ASSA 200 is a domain application software which gathers instances associated with real world observations from the outside world 300 (as depicted in FIG. 3), receives queries and provides responses to queries and creates effects on the outside world 300 by performing actions in the outside world 300. Details regarding the components of the ASSA will now be discussed below with reference to FIGS. 2 and 3.

As shown in FIGS. 2 and 3, according to an embodiment of the present invention, the ASSA 200 includes an ASSA interface adapter ("AIA") 201, a semantic repository 202, an inference engine 204 (referred to as "a semantic reasoner"), and algorithm adapters 208. According to an embodiment of the present invention, the interface adapter 201 translates between varying message formats (e.g., adapted formats) used by the outside world 300 and standard formats used internally to ASSA 200.

According to an embodiment of the present invention, data are observed in the outside world 300 using external sensors, systems or other agents (not shown). According to an embodiment of the present invention, the other agents may include other ASSAs when working cooperatively. Details will be discussed below with reference to FIG. 4. Instances of the data observed are received via the interface adapter 201. Upon receipt of the instances, the interface adapter 201 inputs these instances to the semantic repository 202 from an external source at the outside world 300. According to an embodiment of the present invention, the external source is one of a sensor, a user, a system or other software agent. According to an embodiment of the present invention, the instances are in a standard format. The interface adapter 201 also receives actions from the semantic reasoner 204 which result from inferences made at the semantic reasoner 204. These actions are translated by the interface adapter 201 to message formats unique to specified by the external source (i.e., external sensors, systems, and agents).

In addition to the instances and actions, the interface adapter 201 also receives queries from users, systems, and other software agents external to the ASSA 200. According to an embodiment of the present invention, the queries are in a non-standard format when received at the interface adapter 201 and translated into a standard format within the interface adapter and input to query the semantic repository 202. Further, the interface adapter 201 translates responses to the queries input, from the semantic repository 202 and provides the responses in adaptable formats to the external users, systems and agents.

According to an embodiment of the present invention, the semantic repository 202 is configured to store triples, and to receive instances and queries from the interface adapter 201. The semantic repository 202 is further configured to provide the instances to the semantic reasoner 204, process inferences on triples made by the semantic reasoner 204 and send responses to queries back to the interface adapter 201.

According to an embodiment of the present invention, the semantic repository 202 utilizes the ontology 210 via the semantic reasoner 204 for generating the semantic inferences. According to an embodiment of the present invention, the ontology 210 is user-defined and is in a standard format.

According to an embodiment of the present invention, the semantic reasoner 204 is an inference engine that creates semantic inferences on instances represented as triples, based on the ontology 210 and on the semantic rules 212 that operates on instances to develop a higher level of knowledge. According to an embodiment of the present invention, the semantic rules 212 are also user-defined. The ontology 210 may be specified e.g., in resource description framework ("RDF") or web ontology language ("OWL")). Further, the semantic rules may be specified, e.g., in semantic web rule language ("SWRL"), which is a W3C specification that combines OWL and Rule Markup language ("RuleML").

According to an embodiment of the present invention, the algorithm adapters 208 are software components in communication with the semantic reasoner 204 that enable results of algorithms 214 (e.g., Algorithm 1 through Algorithm N to be input into the semantic reasoner 204. These adapters 208 are configurable and translate the results of various algorithms 214 into the form of instances to be input into the semantic reasoner 204 to thereby add more power to its reasoning capability while off-loading computationally-intensive calculations which are user-defined and application-specific. According to an embodiment of the present invention, the algorithms 214 are defined by a user and plugged into the ASSA 200 via the algorithm adapters 208. For example, a semantic rule 212 may reference an entity attribute (e.g., entity position or speed) that is the result of an algorithm 214. Thus, according to an embodiment of the present invention, the semantic reasoner's 204 reasoning capabilities are supplemented by the array of algorithms 214. According to another embodiment of the present invention, a plurality of ASSAs 200 may be used together in a multi-agent system.

Figure 4:
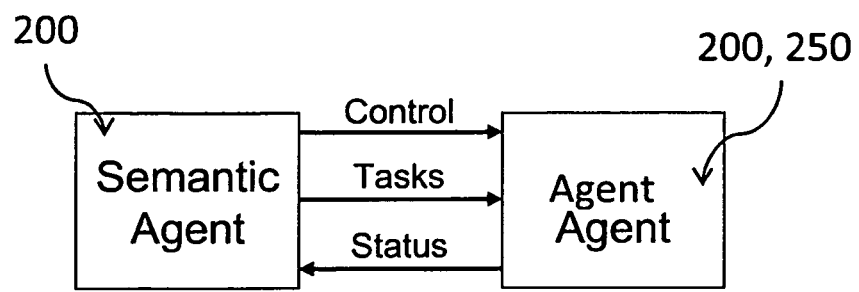
FIG. 4 is a diagram illustrating a relationship between an ASSA and a simple agent or other ASSA in a multi-agent system that can be implemented within embodiments of the present invention.

FIG. 4 is a diagram illustrating a relationship between an ASSA and a simple agent or other ASSA in a multi-agent system that can be implemented within embodiments of the present invention. As shown in FIG. 4, in a relationship, the ASSA 200 may directly control and assign tasks to an agent (i.e., a simple software agent 250 or other ASSA 200). The simple software agent 250 or other ASSA 200 may then provide status information regarding completion of the assigned tasks, for example, to the controlling ASSA 200.

According to an embodiment of the present invention, in a multi-agent system having a plurality of ASSAs 200, the ASSAs 200 may operate in different configurations. For example, according to one embodiment of the present invention, the ASSAs 200 may operate in an authority-based hierarchy configuration where a single ASSA 200 controls the other ASSAs 200 by delegating tasks to the inferior ASSAs 200. This type of configuration may include multiple levels. The ASSAs 200 may also control the actions of other software agents (i.e., non-ASSAs).

The present invention is not limited to any particular type of configuration and may vary accordingly. Details regarding other types of configurations will be discussed below.

According to another embodiment, the multi-agent system may be configured as a collaborating team with specialized roles, where for example, the ASSAs 200 and/or other software agents 250 each have different roles and they collaborate in a manner that utilizes the specialties and roles of the other agents 200, 250 on the team. The roles may include a data collector, a supervisor, a domain supervisor, a scout (e.g., for use in indications and warnings), an advisor (e.g., a decision aid), and a simulator.

According to yet another embodiment of the present invention, the multi-agent system may be in collaborating peers configuration where all the ASSAs 200 have equivalent levels of capabilities. In this type of configuration, each ASSA 200 may be configured by assigning respective resources and areas of responsibility and tasks, for example. The ASSAs 200 collaborate together to share knowledge in order to optimize the objectives of the team.

According to yet another embodiment of the present inventions, the multi-agent system may be in a mixed configuration where there are multiple teams of ASSAs 200 and each member of each team of ASSAs 200 may be the apex of lower level hierarchies.

Additional details regarding designing and implementing the ASSAs and multi-agent systems will be discussed below with reference to FIGS. 5 through 7.

Figure 5:
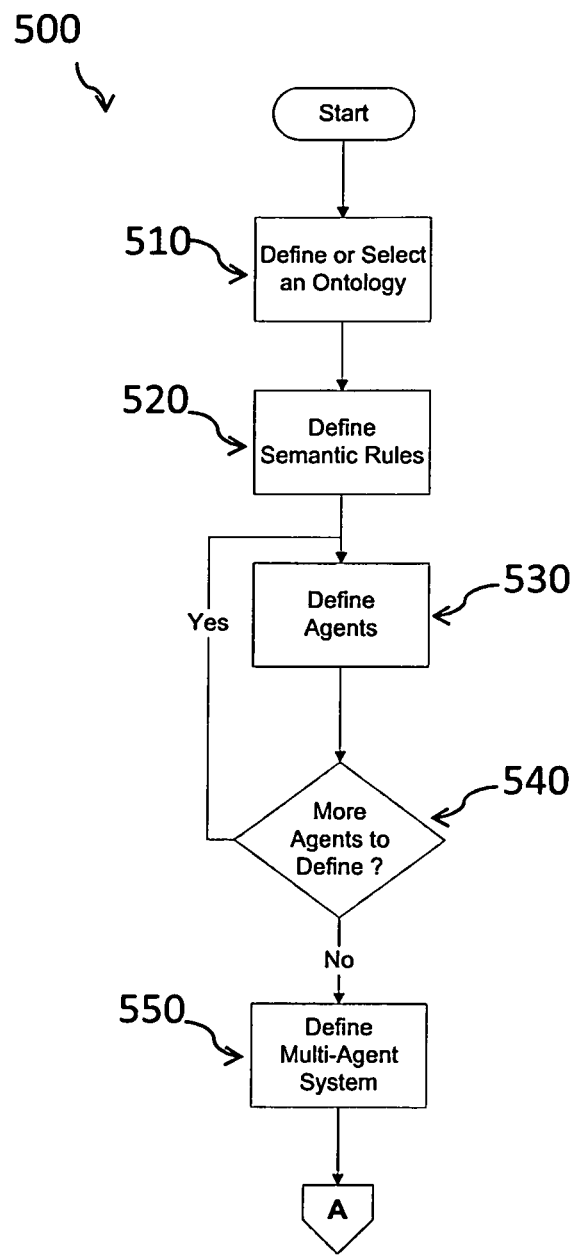
FIGS. 5 and 6 are flowcharts illustrating a computer-implemented method for designing and implementing ASSAs and multi-agent systems that can be implemented within embodiments of the present invention.
Figure 6:
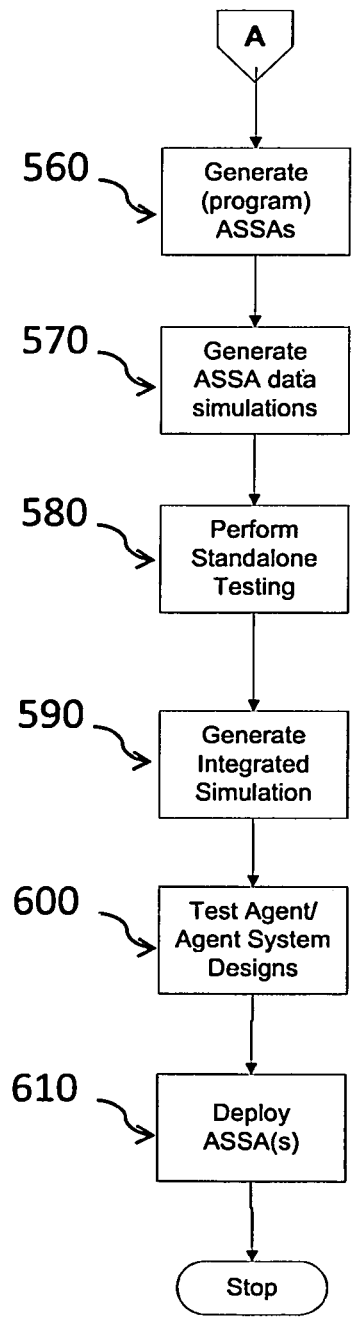

FIGS. 5 and 6 are flowcharts illustrating a computer-implemented method for designing and implementing ASSAs and multi-agent systems that can be implemented within embodiments of the present invention.

As shown in FIG. 5, the method 500 begins at operation 510, where an ontology 210 is defined or selected. From operation 510, the process continues to operation 520 where semantic rules are defined or selected. The semantic rules include behavior rules for later use in defining agent behavior (as depicted in FIG. 7 discussed below). As mentioned, both the ontologies 210 and semantic rules 212 (as depicted in FIGS. 2 and 3, for example), may be user-defined or pre-defined, in accordance with an embodiment of the present invention. That is, the user may select a pre-defined ontology 210 or set of semantic rules 212 or define a new ontology 210 or new semantic rules 212 or combine new and pre-defined semantic rules 212 for use in an ASSA 200. Therefore, according to an embodiment of the present invention, a library of ontologies 210 and a library of semantic rules 212 may be maintained for use.

From operation 520, the process continues to operation 530, where the ASSA agents 200 are defined. According to an embodiment of the present invention, a user may define the agents 200 until the user's requirements have been satisfied. Additional details regarding operation 530 will be described below with reference to FIG. 7.

Figure 7:
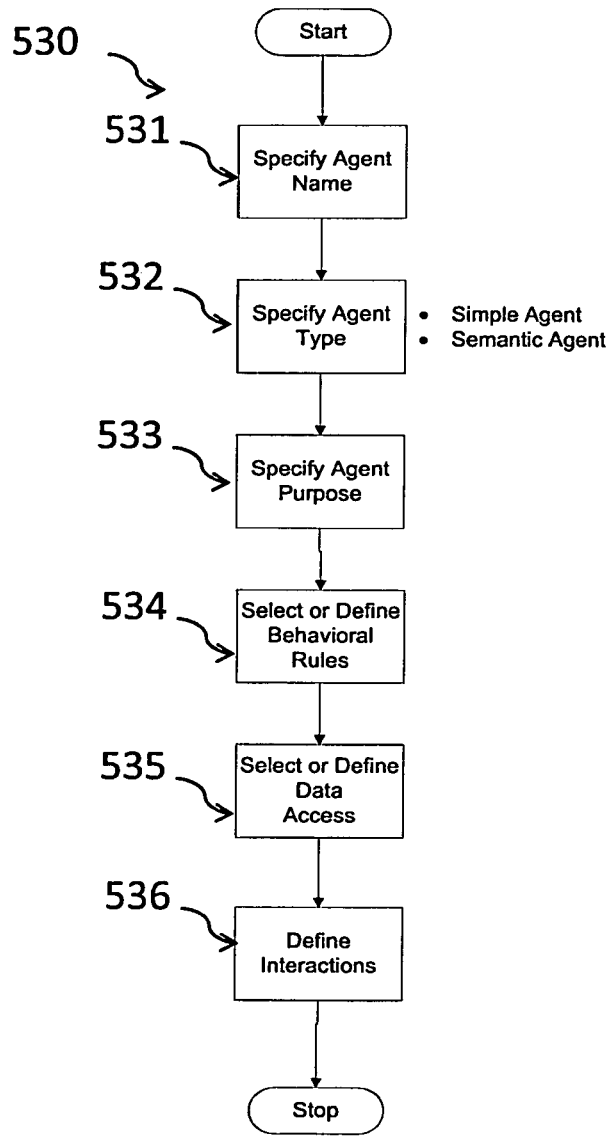
FIG. 7 is a flowchart illustrating an operation for defining agents within the method shown in FIG. 5 that can be implemented within embodiments of the present invention.

FIG. 7 is a flowchart illustrating an operation for defining agents (at operation 530) of the method shown in FIG. 5 that can be implemented within embodiments of the present invention. According to an embodiment of the present invention, the user may define a multi-agent system if desired, where the user defines different types of agents (i.e., component agents), and agent interactions between each software agent and with an operating environment. The user also defines the roles and/or domains of each agent within the multi-agent system. As shown in FIG. 7, at operation 531, the user may specify an agent name for an agent to be defined. From operation 531, the process continues to operation 532 where the user specifies an agent type, i.e., an ASSA 200 or a simple agent 250 (as depicted in FIG. 4). From operation 532, the process continues to operation 533 where the user specifies a purpose or role of the agent. From operation 533, the process continues to operation 534 where the user may select pre-defined behavior rules as defined at operation 520 in FIG. 5, or define new behavior rules for the agent. Alternatively, similar to the ontology 210 and the set of semantic rules 212, a combination of pre-defined and new behavior rules may be used for an agent. From operation 534, the process continues to operation 535 where the user selects or defines a method of data access of data sources, for example, to be implemented by the agent. Next, at operation 536, interactions of the agent with other agents are defined. Alternatively or in addition to defining the interactions, an operational environment may also be defined.

Now referring back to FIG. 5, upon defining agents at operation 530, the process continues to operation 540 where it is determined whether additional agents need to be defined. If so, the process returns to operation 530 where another agent is defined. If not, the process continues to operation 550 where a multi-agent system may be defined.

According to an embodiment of the present invention, operations 510 through 550 are not limited to being performed in a particular order and therefore may be performed in any order as desired by the user. Upon designing of the agents and multi-agent systems as desired, the design process continues to FIG. 6, where a user may program the agents by generating them based on the resulting design, and the agent architecture as shown in FIG. 3, for example.

As shown in FIG. 6, at operation 560, an agent may be generated based upon the design. From operation 560, the process continues to operation 570 where agent data simulations are generated. From operation 570, the process continues to operation 580 where stand-alone testing may be performed on the generated agent using the data simulations. From operation 580, the process continues to operation 590 where an integrated simulation is generated to provide a simple simulation of the environment in which the agent will operate. From operation 600, a test agent or agent system designs are formed. From operation 600, the process continues to operation 610 where the final agent (e.g., an ASSA 200) is deployed, e.g., on multiple, distributed computers on a network.

According to an embodiment of the present invention, the library of ASSA designs and design templates may be maintained for use. Thus, instantiations of ASSAs 200 and multi-agent systems may then be created from the resulting design. Further, as mentioned, simulations may be configured and generated for integration with an Agent-based modeling and simulation (ABMS) system, which may be used for simulation, analysis and evaluation may also be provided as discussed above with reference to operations 570 through 600. Additional details regarding these embodiments will be discussed below with reference to FIGS. 8 through 16.

According to one embodiment, an ontology-based data simulation (OBADS) apparatus may be formed which enables the creation of integration simulations that can be used to test ASSAs 200, multi-agent systems, and any application or system based on formal semantics such as for military applications, commercial semantic web applications, test bed for new semantic web technologies, simulation of complex agent behaviors to support analysis of complex systems, user training support through simulation, and other applications. According to an embodiment of the present invention, the OBADS apparatus simulates entity attributes. For example, a simulated entity may be an aircraft whereby the aircraft attributes may be include identity (e.g., friendly, hostile, or unknown), position and speed. Additional details are discussed below with reference to FIGS. 8 through 10.

Figure 8:
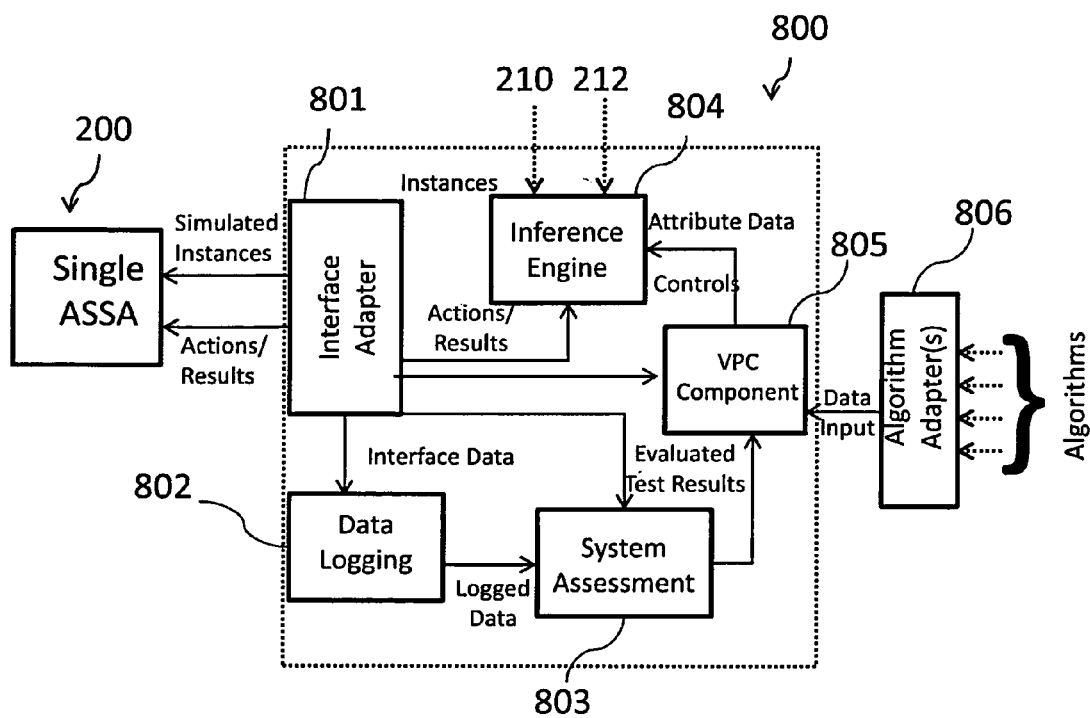
FIG. 8 is a diagram illustrating the use of an ontology-based data simulation (OBADS) apparatus for standalone testing of a single ASSA that can be implemented within embodiments of the present invention.

FIG. 8 is a diagram illustrating the use of an OBADS apparatus that can be implemented within embodiments of the present invention for standalone testing of a single ASSA. As shown in FIG. 8, an OBADS apparatus 800 is provided. According to an embodiment of the present invention, the OBADS apparatus 800 may include an interface adapter 801, a data logging component 802, a system assessment component 803, a semantic reasoner 804, a visualization, planning and control (VPC) component 805 and one or more algorithm adapters 806. The interface adapter 801 accepts actions and test results from a single ASSA 200 under test. The interface adapter 801 sends the actions and test results to the semantic reasoner 804, the VPC component 805 and the system assessment component 803, respectively.

The interface adapter 801 also sends interface data to the data logging component 802. The interface data includes data sent and received by the interface adapter 801. The data logging component 802 logs the interface data and transfers the logged data to the system assessment component 803. The system assessment component 803 evaluates the test results and provides the test results to the VPC component 805 for display.

According to an embodiment, the VPC component 805 receives data input from one or more algorithms via one or more algorithm adapters 806. The input data includes simulated attributes for an entity, for example. The VPC component controls the operation of the semantic reasoner 804 and provides the semantic reasoner 804 with simulated attributed data. The semantic reasoner 804 uses the attribute data along with an ontology 210 and semantic rules 212 to provide simulated instances to the single ASSA 200 under test via the interface adapter 801 which converts the simulated instances to the interface of the ASSA 200. As mentioned above, the ontology 210 includes triples that represent entities, their attributes, and relationships among entities. The OBADS apparatus 800 simulates instances of entities.

The attributes simulations provided by the VPC component 805 may represent attributes associated with an entity, a complex algorithm for movement, etc. The attribute simulations may be time-based by specifying changes over time, rule-based by defining rules for how the attributes change over time, or a combination thereof. According to an embodiment of the present invention, the time-based reporting may be specified on multiple bases, e.g., reported once, periodically at a time interval or based on random selection from a probability distribution. The simulation and reporting of groups of entities may be designed and controlled as a group. The simulation output of the OBADS apparatus 800 includes at least one set of timestamps associated with entity instances including attribute values. Programmable criteria for reporting entities are specified by use thereof and may include reporting at a time interval, a one-time event or based on a probability distribution.

According to an embodiment of the present invention, the OBADS apparatus 800 provides various views for design of a simulation. These views include an entity view, event sequence view, composite view, and a simulation resources view, for example. The output formats from the OBADS apparatus 800 may be programmable and extensible via plug-in software modules. The formats may include, for example, OWL, RDF, XML and structured query language (SQL). Further, the VPC component 805 may be a software component, for example.

According to an embodiment of the present invention, OBADS apparatus 800 is a distributed simulation that allows a user to establish rules about where entity attribute simulations run, based on such factors as entity type, processor loading, number of entities, etc. The OBADS apparatus 800 also provides performances logging for simulations. Further as mentioned above, the OBADS apparatus 800 performs visualization and control, test coverage planner, data logging, data simulation, and system assessment.

As shown in FIG. 8 and described above, the OBADS apparatus 800 is used for the verification, validation, or testing and evaluation of a single, standalone ASSA 200, for example. The present invention is not limited to use of the OBADS apparatus 800 with a single standalone ASSA and may vary accordingly. The OBADS apparatus 800 simulates instances of real-world data to the ASSA 200 and it collects the actions of the ASSA 200 in response to the data. According to an embodiment of the present invention, the OBADS apparatus 800 is not limited to being used for simulation and testing of ASSAs 200, and may be used for testing any semantic-based reasoning system or other system for simulating data in the environment as shown in FIGS. 9 and 10.

Figure 9:
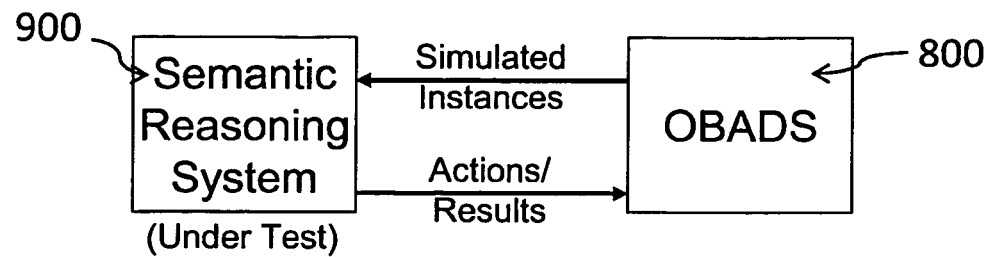
FIG. 9 is a diagram illustrating simulation of data to a semantic-based reasoning system using the ontology-based data simulation apparatus that can be implemented within embodiments of the present invention.

FIG. 9 is a diagram illustrating simulation of data to a semantic-based reasoning system using the ontology-based data simulation apparatus that can be implemented within embodiments of the present invention. FIG. 10 is a diagram illustrating simulation of data to an external system using the ontology-based data simulation apparatus that can be implemented within embodiments of the present invention.

Referring to FIG. 9, the OBADS apparatus 800 may be used for verification, validation, testing and evaluation of the semantic-based reasoning system 900. According to an embodiment of the present invention, the OBADS apparatus 800 simulates instances of external (e.g., real world) data to a semantic-based reasoning system 900. The OBADS apparatus 800 also collects actions/results of the semantic-based reasoning system 900.

Figure 10:
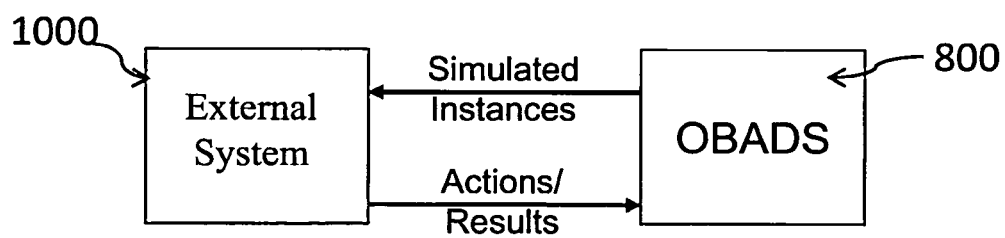
FIG. 10 is a diagram illustrating simulation of data to an external system using the ontology-based data simulation apparatus that can be implemented within embodiments of the present invention.

As shown in FIG. 10, according to another embodiment of the present invention, the OBADS apparatus 800 may be used to simulate data in an environment of any system 1000 for training simulation purposes, for example. As shown, the OBADS apparatus 800 simulates instances of external data to the system 1000.

According to yet another embodiment of the present invention, an online adaptive reasoning for simulation ("OARS") apparatus may be used for simulation, decision-aiding and online interpretation of simulation results. A detailed description of the OARS apparatus will be described below with reference to FIGS. 11 through 16.

Figure 11:
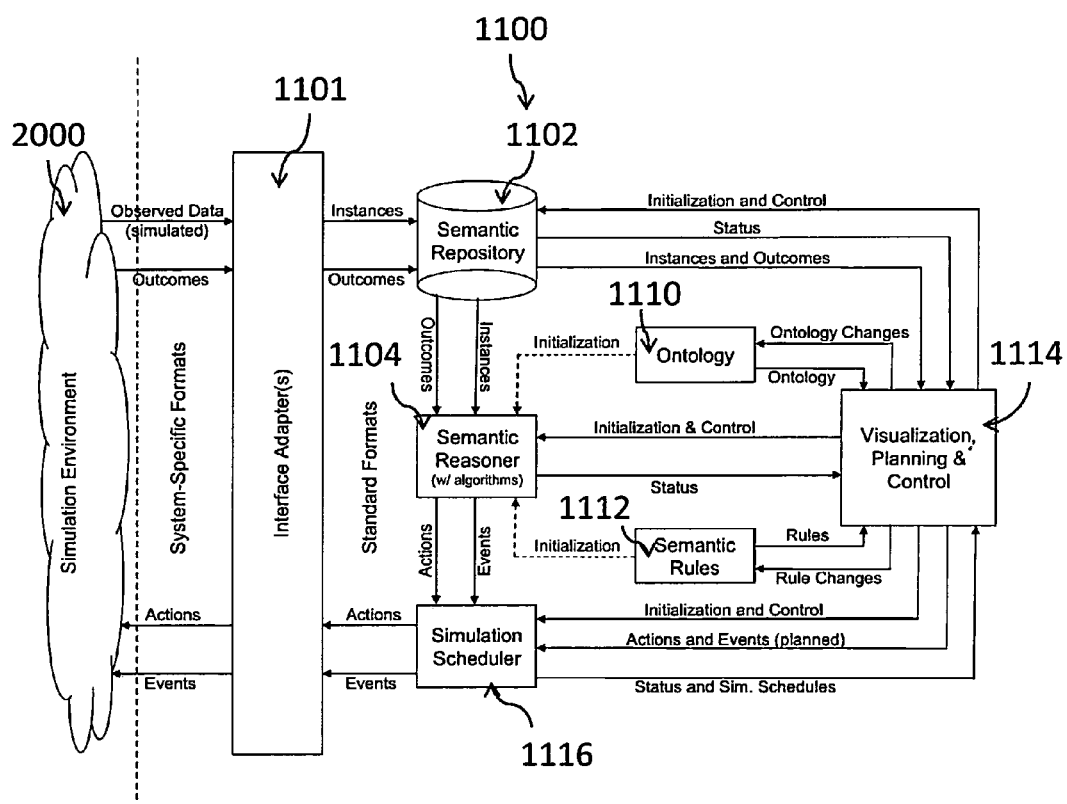
FIG. 11 is a diagram illustrating an online adaptive reasoning for simulation (OARS) apparatus that can be implemented within embodiments of the present invention.

FIG. 11 is a diagram illustrating an OARS apparatus that can be implemented within embodiments of the present invention. The OARS apparatus may be used for simulation of dynamic and adaptive environments and interpretation of simulation results. As shown in FIG. 11, the OARS apparatus 1100 includes at least one interface adapter 1101, a semantic repository 1102, a semantic reasoner 1104, ontology 1110 and semantic rules 1112, a visualization, planning and control (VPC) component 1114 and a simulation scheduler component 1116. According to an embodiment of the present invention, both the VPC component 1114 and the simulation scheduler component 1116 may be software components implemented within the OARS apparatus 1100.

The interface adapter 1101 translates between the system 1100 and a simulation environment 2000 external to the system 1100 in which the system 1100 is participating. The system 1100 receives simulated observed data and simulation outcomes from the simulation environment 2000 and the interface adapters 1101 translate between standard formats used internally by the OARS apparatus 1100 and various formats used in the external simulation environment 2000. The OARS apparatus 1100 further includes a semantic repository 1102 similar to the semantic repository 202 shown in FIG. 3. The simulated instances and outcomes are stored in the semantic repository 1102. The semantic repository 1102 transmits the instances and outcomes to the semantic reasoner 1104 and to the VPC component 1114 for further processing.

The semantic reasoner 1104 receives the simulated instances and outcomes from the semantic repository 1102 and determines actions and events for inputting into the simulation environment 2000.

The VPC component 1114 acts as a user interface, and receives status information from the other components of the system 1100 (i.e., the semantic repository 1102, the semantic reasoner 1104 and the simulation scheduler component 1116) and initializes and controls these components, and displays the status of each component. It further provides a means for display, editing and activation of the ontology 1110 and the semantic rules 1112. The VPC component 1114 also uses all the information received for display and use in planning and controlling of the OARS 1100 via the simulation scheduler component 1116.

According to an embodiment of the present invention, the semantic reasoner 1104 makes inferences on the simulated instances and outcomes based on the ontology 1110 and semantic rules 1112. According to an embodiment of the present invention, the ontology 1110 and semantic rules 1112 are user-defined. Each may be selected by or newly defined by the user (as depicted in operations 510 and 520 of FIG. 5). The semantic reasoner 1104 generates actions and events for the simulation environment 2000 as a result of the inferences made and forwards these actions and events to the simulation scheduler component 1116. According to an embodiment of the present invention, the semantic reasoner 1104 may be supplied with semantic rules 1112 including high-level semantic rules for advanced adaptive behaviors or explanatory rules, for example. Further, the semantic reasoner 1104 may interpret simulation results in real-time.

According to an embodiment of the present invention, the simulation scheduler component 1116 schedules the simulation of the actions and events for input to the simulation environment 2000. The actions and events are transmitted to the simulation environment 2000 via the interface adapter 1101. The interface adapter 1101 changes the actions and events to system-specific formats compatible with the simulation environment 2000. Examples of applications of the OARS apparatus 1100 will now be described below with reference to FIGS. 12 through 16.

Figure 12:
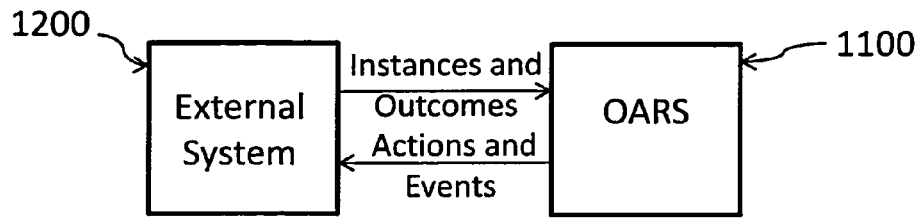
FIG. 12 is a diagram illustrating an application of the OARS apparatus to an external system (e.g., a modeling and simulation (M&S) system) that can be implemented within embodiments of the present invention.

FIG. 12 is a diagram illustrating an application of the OARS apparatus to an external system (e.g., a modeling and simulation (M&S) system). As shown in FIG. 12, the OARS apparatus 1100 is applied to the external system 1200. The OARS apparatus 1100 receives simulated instances and outcomes from the external system 1200 and returns simulated actions and events that are the result of adaptive simulation to the external system 1200.

Figure 13:
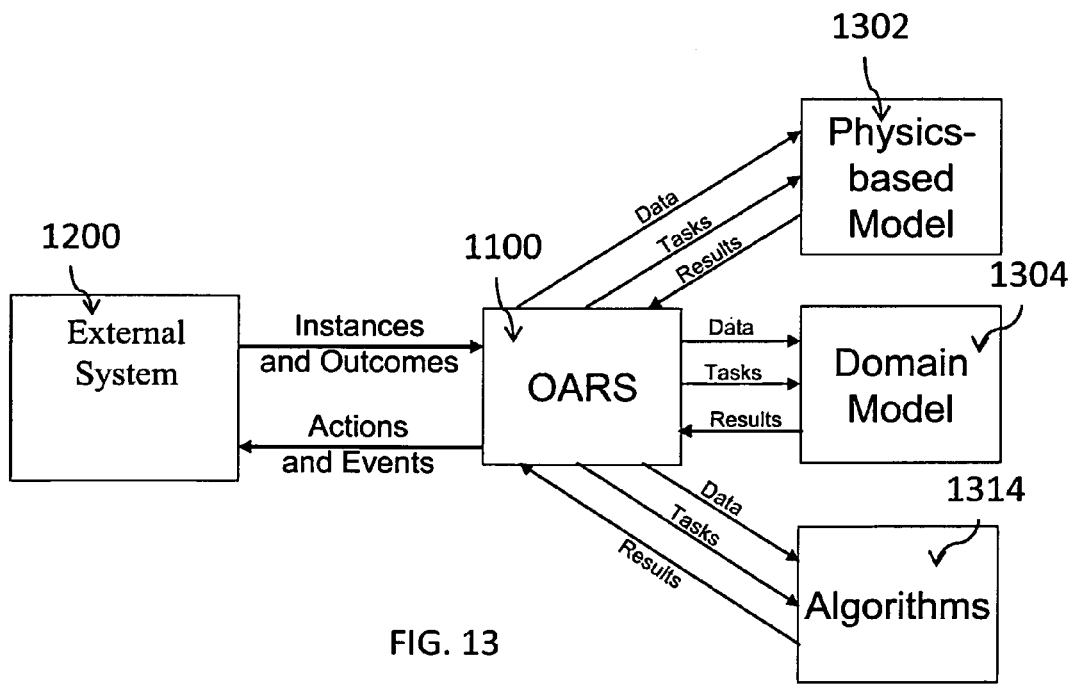
FIG. 13 is a diagram illustrating an application of the OARS apparatus to an external system (e.g., an operational system or M&S system) using external models and algorithms that can be implemented within embodiments of the present invention.

FIG. 13 is a diagram illustrating an application of the OARS apparatus to an external system using external models and algorithms that can be implemented within embodiments of the present invention. As shown in FIG. 13, the OARS apparatus 1100 is coupled with detailed models (e.g., physics-based models 1302 and domain-specific models 1304) and supplemental algorithms 1314. The OARS apparatus 1100 tasks these models 1302 and 1304 and supplemental algorithms 1314, supplies data for performance of calculations thereto and obtains the results therefrom. The data are derived from instances and outcomes provide to the OARS apparatus 1100 from the external system 1200 (e.g., an operational system or M&S system). According to an embodiment of the present invention, the OARS apparatus 1100 applies semantic-based logic to the results received and higher-order rules to determine actions and events that will be provided back to the external system 1200.

Figure 14:
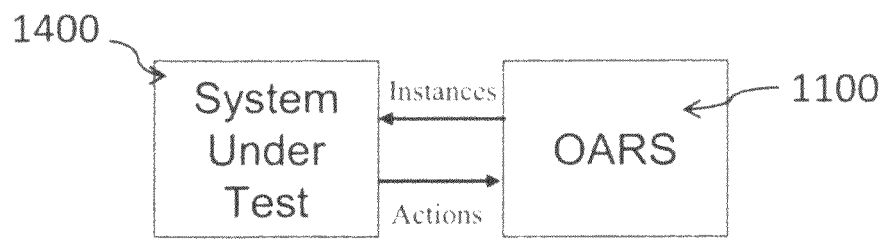
FIG. 14 is a diagram illustrating an application of the OARS apparatus to an external system for system-level testing that can be implemented within embodiments of the present invention.

FIG. 14 is a diagram illustrating an application of the OARS apparatus to an external system for system-level testing that can be implemented within embodiments of the present invention. As shown in FIG. 14, the OARS apparatus 1100 simulates instances and outcomes and forwards them to the external system 1400 (e.g., a system under test) for system level testing. The external system 1400 then forwards actions and results back to the OARS apparatus 1100 in response to the receives instances and outcomes.

Figure 15:
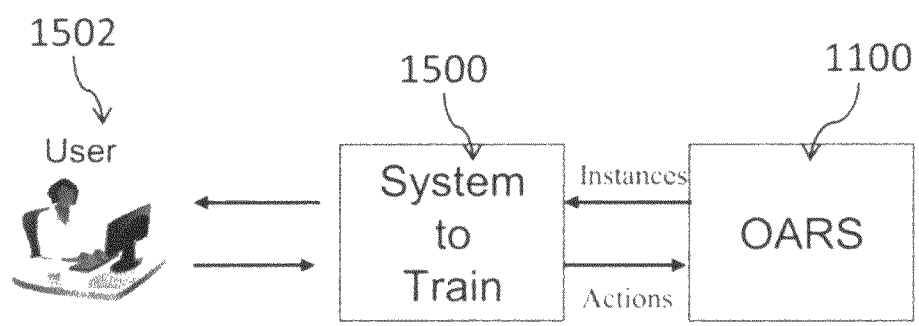
FIG. 15 is a diagram illustrating an application of the OARS apparatus to a user simulation training system that can be implemented within embodiments of the present invention.

FIG. 15 is a diagram illustrating an application of the OARS apparatus to a user simulation training system that can be implemented within embodiments of the present invention. As shown in FIG. 15, the OARS apparatus 1100 interfaces with a system 1500 that provides a user interface (e.g., a computer) 1502. The OARS apparatus 1100 forwards simulated instances and outcomes to the system 1500 which are then displayed to a user via the user interface 1502 for manipulation and training purposes. The system 1500 then forwards the results and actions back to the OARS apparatus 1100.

Figure 16:
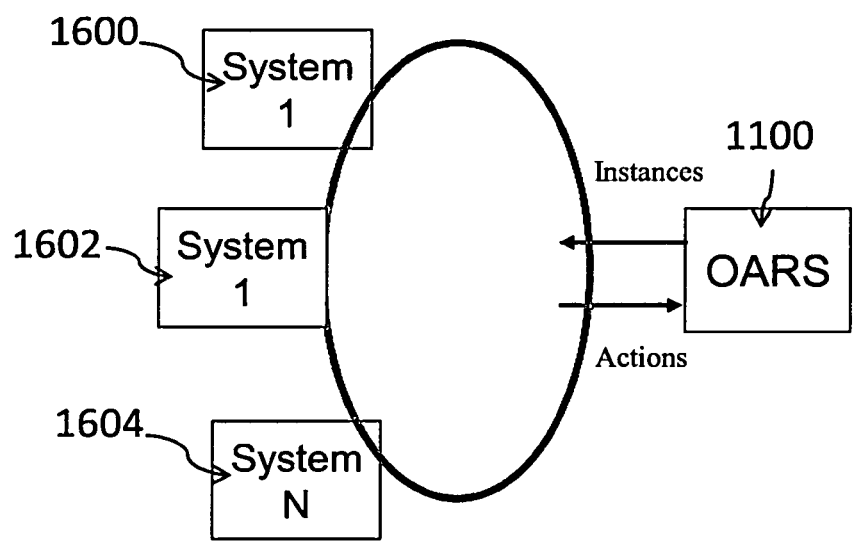
FIG. 16 is a diagram illustrating an application of the OARS apparatus to a network of user simulation training systems that can be implemented within embodiments of the present invention.

FIG. 16 is a diagram illustrating an application of the OARS apparatus to a network of user simulation training systems that can be implemented within embodiments of the present invention. As shown in FIG. 16, the OARS apparatus 1100 is in communication with a network of systems 1600, 1602 and 1604 in training. The OARS apparatus 1100 is able to provide training to each system 1600, 1602, and 1604 simultaneously or selectively as desired by the user. The OARS apparatus 1100 is able to provide online (e.g., real-time) interpretation of simulation results during simulation.

According to alternative embodiments of the present invention, the computer-implemented methods of designing agents, and multi-agent systems and the functions of the simulation systems may be implemented in software, firmware, hardware, ontology languages, rules languages or some combination thereof. As one example one or more embodiments of the present invention can be included in an article of manufacture (e.g., one or more computer program products) having, for instance, computer usable media. The media has embodied therein, for instance, computer readable program code means for providing and facilitating the capabilities of the present invention. The article of manufacture may be included as a part of a computer system or sold separately.

Additionally, at least one program storage device readable by machine, tangibly embodying at least one program of instructions executable by the machine to perform the capabilities of the present invention can be provided. The foregoing exemplary embodiments may be provided in the form of computer-implemented processes and apparatuses for practicing those processes. For example, they may be provided in the form of computer program code containing instructions embodied in tangible medium, such as floppy diskettes, CD ROMs, hard drives, or any other computer-readable storage medium wherein when the computer program code is loaded into and executed by a computer, the computer becomes an apparatus for practicing the exemplary embodiments.

The flow diagrams depicted herein are just examples. There are many variations to these diagrams or the operations described therein without departing from the spirit of the invention. For instance, the operations may be performed in a differing order, or some operations may be added, deleted, or modified. All of these variations are considered a part of the claimed invention.

Embodiments of the present invention enables high levels of automation and for decision aiding via an ASSA which is highly programmable for any specialized task and can be applied to numerous domains. The embodiments of the present invention further enable distributed systems of these ASSAs to accomplish complex tasks and to support varying levels of cooperation and many different multiple-agent organizational structures along with rapid design, implementation of ASSAs and multi-ASSA systems, and creation of integrated simulations to test the ASSAs and multi-ASSA systems and any application or system based on formal semantics. The embodiments of the present invention further enable advanced reasoning capabilities that can be used in integrated simulations and intelligent online (i.e., real-time) interpretation of the simulation results during the simulation process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An ontology-based simulation apparatus comprising:
an interface adapter configured to receive actions and simulation test results from one of a semantic software agent and an external system in communication with the ontology-based simulation apparatus;
an inference engine configured to receive the actions and simulation test results from the interface adapter, and ontology basis, semantic rules and attribute data, the inference engine including semantic reasoner receiving instances from an algorithm adapter and receives initialization from the ontology basis and the semantic rules; and
a visualization, planning and control component configured to control an operation of the inference engine,
wherein the inference engine uses the attribute data along with the ontology and the semantic rules to provide simulated instances to the semantic software agent or the external system via the interface adapter.

2. The ontology-based simulation apparatus of claim 1, further comprising
a data logging component configured to log interface data received from the interface adapter; and
a system assessment component configured to receive the logged interface data from the data logging component and the simulation test results from the interface adapter, to evaluate the simulation test results and to perform a system assessment.

3. The ontology-based simulation apparatus of claim 1, wherein the visualization, planning and control component is further configured to receive input data from at least one algorithm via at least one algorithm adapter wherein the input data includes simulated attributes of an entity.

4. An online simulation apparatus comprising:
an interface adapter configured to receive simulated data and outcomes from a simulation environment;
a semantic repository configured to receive the simulated data in the form of instances and the outcomes from the interface adapter; and
an inference engine configured to receive the instances and outcomes from the semantic repository and to generate semantic inferences on the instances based on an ontology basis and semantic rules, and to generate in real time actions and events for input into the simulation environment, the inference engine including a semantic reasoner that receives instances from an algorithm adapter, initialization from the ontology basis and the semantic rules.

5. The online simulation apparatus of claim 4, further comprising:
a visualization, planning and control component configured to display status information and to perform editing and activation of the ontology and the semantic rules via a user, and to plan and control simulation of the simulation environment; and
a simulation scheduler configured to receive the actions and events generated from the inference engine and to schedule simulation of the simulation environment upon the control of the visualization, planning and control component, wherein the actions and events generated are transmitted to the simulation environment via the interface adapter.

6. The online simulation apparatus of claim 5, wherein the simulation environment comprises at least one external system.

7. The online simulation apparatus of claim 6, wherein the online simulation apparatus is coupled with a plurality of models and algorithms, wherein the online simulation apparatus is configured to assign tasks and supply data for performance of calculations to the plurality of models and the algorithms, and to obtains results therefrom, and wherein the data are derived from the instances and outcomes provided by the at least one external system.

8. The online simulation apparatus of claim 6, wherein the online simulation apparatus is configured to perform system-level testing on the at least one external system, wherein the online simulation apparatus simulates instances and outcomes and forwards the instances and outcomes to the at least one external system for system-level testing, and the at least one external system forwards actions and results back to the online simulation apparatus in response to the instances and outcomes.

9. The online simulation apparatus of claim 8, wherein the online simulation apparatus interfaces with the at least one external system and a user to perform user simulation training of the at least one external system, wherein the online simulation apparatus forwards instances and outcomes to the at least one external system which are displayed to the user for manipulation and training, and the at least one external system forwards results and actions back to the online simulation apparatus in response to the instances and outcomes.

10. The online simulation apparatus of claim 9, wherein the online simulation apparatus is in communication with a network of external systems in training and provides real-time interpretation of simulation results during simulation, wherein the online simulation apparatus provides training to the external systems simultaneously or selectively, as determined by a user.

* * * * *